United States Patent
Montestruc

(10) Patent No.: US 8,758,190 B2
(45) Date of Patent: *Jun. 24, 2014

(54) GEAR ASSEMBLY WITH ASYMMETRIC FLEX PIN

(75) Inventor: Alfred Montestruc, Houston, TX (US)

(73) Assignee: Friede Goldman United, Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,487

(22) Filed: Jul. 24, 2012

(65) Prior Publication Data

US 2012/0289375 A1 Nov. 15, 2012

Related U.S. Application Data

(63) Continuation of application No. 12/456,096, filed on Jun. 11, 2009, now Pat. No. 8,313,412, which is a continuation-in-part of application No. 12/322,781, filed on Feb. 5, 2009, now Pat. No. 8,216,108.

(51) Int. Cl.
*F16H 57/08* (2006.01)

(52) U.S. Cl.
USPC .......................................... 475/346; 475/347

(58) Field of Classification Search
CPC .......... F16H 1/48; F16H 3/64; F16H 55/0806
USPC ................................. 475/346, 347
See application file for complete search history.

(56) References Cited

U.S. PATENT DOCUMENTS

| 2,127,463 | A | 8/1938 | Roland |
| 2,144,937 | A | 1/1939 | Ryder |
| 2,749,778 | A | 6/1956 | Kuhn |
| 2,848,908 | A | 8/1958 | Hollis |
| 3,754,484 | A | 8/1973 | Roberts |
| 4,201,120 | A | 5/1980 | Segawa |
| 4,620,686 | A | 11/1986 | Conant |
| 7,056,259 | B2 | 6/2006 | Fox |
| 7,297,086 | B2 | 11/2007 | Fox |
| 3,303,713 | A1 | 2/2012 | Hicks |
| 8,216,108 | B2 * | 7/2012 | Montestruc .................... 475/346 |
| 8,313,412 | B2 * | 11/2012 | Montestruc .................... 475/346 |
| 2008/0269007 | A1 | 10/2008 | Cunliffe et al. |
| 2009/0111639 | A1 | 4/2009 | Klingels |
| 2009/0286645 | A1 | 11/2009 | Hahlbeck et al. |
| 2010/0292044 | A1 | 11/2010 | Lahtinen et al. |

FOREIGN PATENT DOCUMENTS

| JP | 04341641 A | 11/1992 |
| WO | 2007054066 A1 | 5/2007 |

* cited by examiner

*Primary Examiner* — Tisha Lewis
(74) *Attorney, Agent, or Firm* — Keaty Law Firm, LLC

(57) ABSTRACT

An epicyclic gear assembly has a plurality of planetary gear sets secured in a carrier. Each planetary gear set has a planet gear supported by a planet shaft, the planet shaft having its opposite ends supported within the carrier, the planet shaft being capable of defecting along at least a part of its length when the gear assembly is subject to torsional and rotational loads.

14 Claims, 7 Drawing Sheets

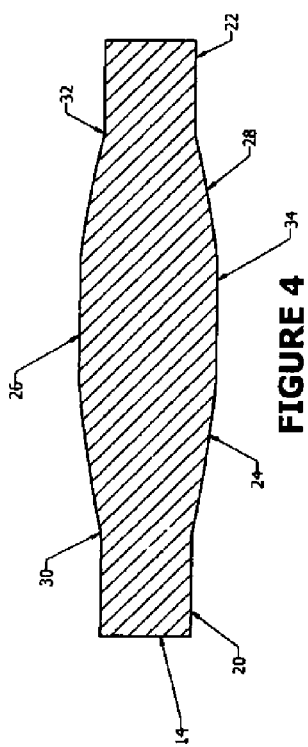
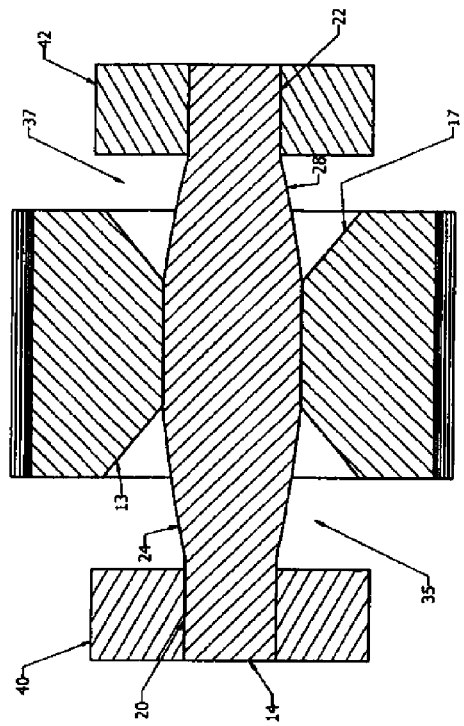
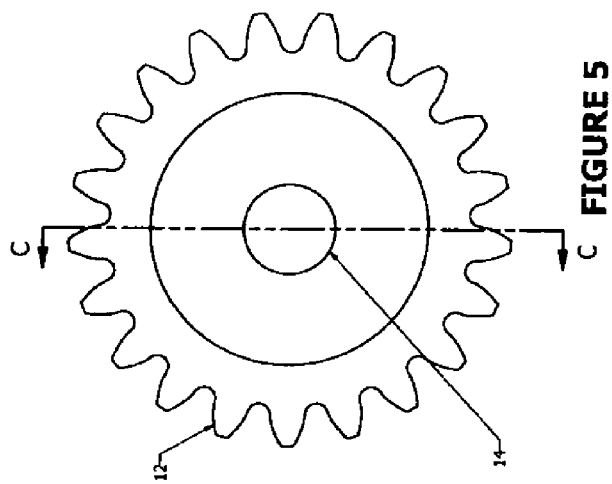

GEAR ASSEMBLY WITH ASYMMETRIC FLEX PIN

CROSS-REFERENCE TO RELATED APPLICATIONS

This application is a continuation of application Ser. No. 12/456,096 filed on Jun. 11, 2009, entitled "Gear Assembly With Asymmetric Flex Pin," now U.S. Pat. No. 8,313,412 issued on Nov. 20, 2012, which is a continuation-in-part of application Ser. No. 12/322,781 filed on Feb. 5, 2009, entitled "Gear Assembly With Tapered Flex Pin," now U.S. Pat. No. 8,216,108 issued on Jul. 10, 2012, the priority of which is hereby claimed and the full disclosures of which are incorporated by reference herein.

BACKGROUND OF THE INVENTION

This invention relates to gear assemblies, and more particularly to planetary gear sets that can be used in rack-and-pinion systems and other such industrial applications.

Planetary gear systems are widely used in a variety of industrial environments. In such arrangements, the rotational input is usually in the form of a sun gear. A plurality of planetary gears are mounted about the sun gear for receiving rotational force from the sun gear through intermeshing of respective teeth. Conventionally, planetary gears are mounted on a rotating planetary gear area, and the output element is usually in the form of a ring gear.

A typical epicyclic gear or planetary gear system in addition to sun gear and a plurality of planet gears uses a ring gear provided with internal teeth. The sun gear is located in the carrier, with the planet gear engaged to the sun and ring gear going around both the planetary gears and the sun gear. The ring gear is typically engaged with all the planet gears. Thus each planet gear is engaged with both the sun and the ring gear, and to none of the other planets, while the ring and sun are each engaged with all the planets. The planets are all mounted to the shafts in a parallel relationship, which relationship would ideally be retained during rotation. Of these three sets of items, sun, planets mounted on the carrier, and the ring gear, one will typically be held fixed and the other to rotate, with power to rotate fed to one rotating component, at a given angular speed and torque, and power taken from the other rotating component at a changed torque and speed related linearly or inversely to the first by the gear ratio.

A common problem in all gear systems both planetary and non-planetary is misalignment of the two gears as their teeth mesh. When the axes of rotation of the gears are not perfectly parallel the partial contacts of the teeth cause expanding and contact stresses to one end of a tooth. Theoretically, potential power loss of the gear assembly output due to misalignment can be 30 percent or higher. The out-of-parallel condition causes significant problems in excessive wear, added friction, added noise, and higher stress in the gear teeth, which causes metal fatigue.

Another issue created in planetary gear assemblies with four or more planet gears is the load distribution between the planet gears. In order to better approximate uniform loading, one of the suggested methods is to allow elastic deformation of planet gear shafts and provide "flexible mounts." Still another problem arises due to deflection of the carrier under load, which will introduce the most misalignment when the gears are subject to maximum load. At such time the carrier torsional deformation introduces the largest misalignment due to the deformation. A significant part of the large percentage of derating of all gears due to misalignment is directly attributable to this fact.

One of the solutions offered by the industry is to use a pair of spaced-apart rigidly connected plates to function as the planet carrier. The double-plate design allows to significantly reduce deflection of the planet shaft and misalignment. However, the conventional double-plate carrier designs are not well suited to the use of flexible mountings for the planets, which in turn makes them poorly suited to use of more than three planets. Also out-of-tolerance issues will tend to be aggravated by the stiffness of those designs Another approach to the problem is shown in U.S. Pat. No. 3,303,713 issued to R. J. Hicks in 1967. According to the '713 patent, a sleeve is interposed between the gear and the shaft, upon which the gear wheel is located. The shaft has opposite end portions rigidly secured between the gear wheel and the carrier. The space between the gear wheel and the carrier is said to allow the shaft to flex to provide uniform loading. Hicks also teaches the shaping of the pin such that it is flattened on the two sides parallel to the radial axis of the sun and perpendicular to the tangential direction of the planet motion. The object of this design is to reduce the section modulus on that axis to allow larger deflections in that direction which better allows for load sharing, and also allows for better prevention of deflection in the radial direction due to centripetal forces.

While the system of the Hicks patent may work satisfactorily in certain environments, there exists a need for a gear assembly for use in high-load environment, such as for instance rack and pinion systems of a jack-up.

SUMMARY OF THE INVENTION

It is, therefore, an object of the present invention to maximize the deflection of the planet gears load to aid in load sharing between planet gears.

It is another object of the invention to provide a planet gear set having a flexible planet shaft that deflects under the torsional and rotational loads applied to the gear assembly.

These and other objects of the invention are achieved through a provision of an epicyclic gear assembly that has a plurality of planetary gear sets secured in a carrier. Each planetary gear set has a planet gear supported by a planet shaft, the planet shaft having its opposite ends supported within the carrier, the planet shaft being capable of defecting along at least a part of its length when the gear assembly is subject to torsional and rotational loads. Each planet shaft has opposite ends supported by a spherical bearing [Spherical roller or CARB (as made by the SKF corporation of Sweden) or spherical journal bearings (such do exist and are well known) should be understood to be included as possible types of spherical bearings used in this invention where the term spherical bearing is used], with the middle part shrink-fitted to the planet gear. The planet shaft has a double-taper aspect, tapering down from the middle part to the opposite ends.

BRIEF DESCRIPTION OF THE DRAWINGS

Reference will now be made to the drawings, wherein like parts are designated by like numerals, wherein

FIG. 4 is a cross-section view of an asymmetric flex pin in for straddle-type epicyclic gear for use in the system of the present invention.

FIG. 5 is an end view of the planet gear for use in the system of the present invention.

FIG. 6 is a cross sectional view of the planet gear fitted with the asymmetric flexible pin of the present invention.

DETAIL DESCRIPTION OF THE INVENTION

Figure 1:
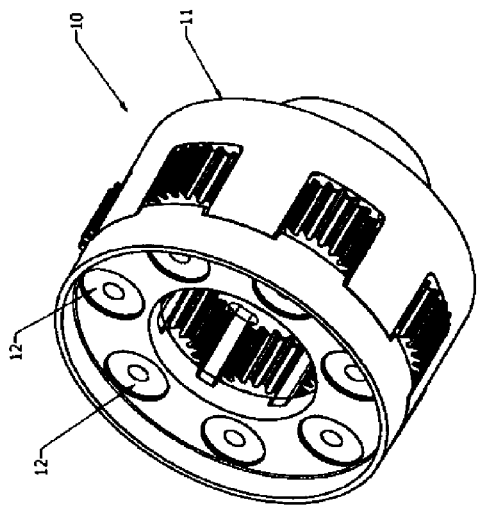
FIG. 1 is a perspective view of a carrier with an asymmetric tapered flex pin in accordance with the present invention.

As discussed above, on any sort of planetary gearbox application, one significant issue is load sharing among the planets. Many effects can cause misdistribution of loads between planet gears. These would include, but are not limited to, tolerance errors in the manufacture of components of the gearbox, side loads introduced to the carrier in the case of a jacking system, storm loads causing deflections of the jacking pinion shaft, the rig leg chord walking off center of the jack case if the leg guides are worn excessively, a wind turbine seeing eccentric loads on the rotor due to the wind speed being higher above the centerline of the rotor than below.

Any of these sorts of issues can cause some planet gear meshes to see significantly higher loads that the others, and to deal with this, a softer (more deflection per unit load) flex pin help by allowing the more loaded planet to deflect more and so push the load via the carrier to other planets is desirable. The present invention solves these problems through the structural aspects of the gear box assembly described below.

Turning now to the drawings in more detail, numeral 10 designates a gear assembly of the present invention. The gear assembly 10 comprises a carrier 11, which may be used in an epicyclic gearing or planetary gearing system that consists of one or more outer gears, or planet gears, revolving about a central, or sun gear. Typically, the planet gears are mounted in the carrier 11 which itself may rotate relative to the sun gear. Epicyclic gearing systems may also incorporate the use of an outer ring gear or annulus, which meshes with the planet gears.

When used in a jack-up leg chord the gear system is designed to move the legs of a jack-up rig, as well as elevate the hull of the rig using a rack-and-pinion system to a height above an anticipated wave action. As the hull is elevated, the teeth of the leg chord engage with the teeth of a jack case. Conventionally, jacking pinions transmit torque to the leg chords, causing the legs to move vertically in relation to the rig hull. A motor positioned on a rig transmits rotation to each pinion through a gear assembly, which is secured to the jack case opposite the pinions. The gear assembly is secured in a gear box with the central pinion, or sun gear being connected to a motor. An outer ring gear is mounted in the gear box.

It is assumed that the planetary gearbox arrangement offers many advantages over traditional gearbox arrangements. One advantage is its unique combination of both compactness and outstanding power transmission efficiencies. Typical efficiency loss in a planetary gearbox arrangement is only 3% per stage. This type of efficiency ensures that a high proportion of the energy being input through the sun gear into the gearbox is multiplied and transmitted into torque, rather than being wasted on mechanical losses inside the gearbox. Another advantage of the planetary gearbox arrangement is load distribution. Because the load being transmitted is shared between multiple planets, or planetary gear sets torque capability is greatly increased. The more planets in the system the greater load ability and the higher the torque density.

The planetary gearbox arrangement also creates greater stability and increased rotational stiffness. However, as stated above, such engineering solutions are not without problems, such as the design complexity and gaps between the meshing teeth during rotation of the sun gear.

As can be seen in the drawings, the planetary gear sets 12 are mounted in the carrier 11 through planetary gear shafts 14. Each planetary gear set has a toothed planet gear which is designed to mesh with the teeth of a sun gear and a ring gear. Each planet gear 12 is press fitted or shrink fitted onto the shaft 14. Each carrier 11 has a high torque connection means 16 that transmit torque from an external power source (not shown) through a shaft, typically a splined shaft that has longitudinal gear-like ridges along its interior or exterior surface.

The planet shafts or flex pins 14 are secured in parallel relationship to each other, with central axes of the planet gears 12 being parallel to the central axis of the carrier 11.

Figure 2:
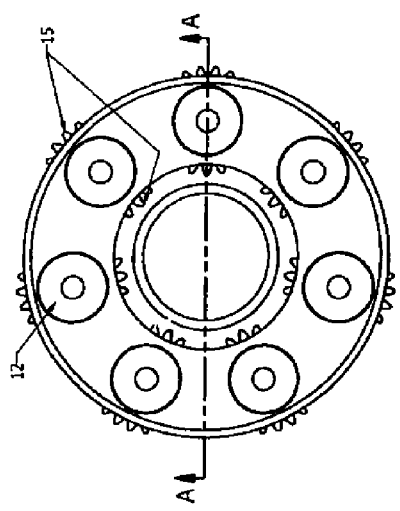
FIG. 2 is an end view of the carrier shown in FIG. 1.

Each planetary gear 12 is provided with teeth 15 that have complimentary contact surfaces for engaging a centrally-located sun gear. Conventionally, the gear assemblies may contain four or more planetary gears surrounding the sun gear. FIGS. 1 and 2 illustrate seven planet gears 12. Rotation of the motor shaft and causes rotation of the planet gears 12, and engagement of the rotating planet gear 12 about the individually secured shafts 14 causes the planet gears 12 to revolve around the sun gear.

As can be seen in FIG. 4, each planet gear shaft 14 is an asymmetric pin that has a first cylindrical end 20 and an opposite second cylindrical end 22. A generally tapered first conical portion 24 extends from the first cylindrical end 20 toward a centerline 26, which designates a centerline of the planet 12. A second tapered conical portion 28 extends from the second cylindrical end 22 toward the centerline 26 of the planet 12. As can be clearly seen in FIG. 6, the centerline 26 does not represent the geometric center of the flex pin 14. In the preferred embodiment, the radius of the convex of the first conical portion 24 is not equal to the radius of the convex of the second conical portion 28.

A small radius concave portion 30 is disposed between the first cylindrical end 20 and the first tapered conical portion 24. A similar small concave radius portion 32 is disposed between the second cylindrical end 22 and the second tapered conical portion 28.

Figure 3:
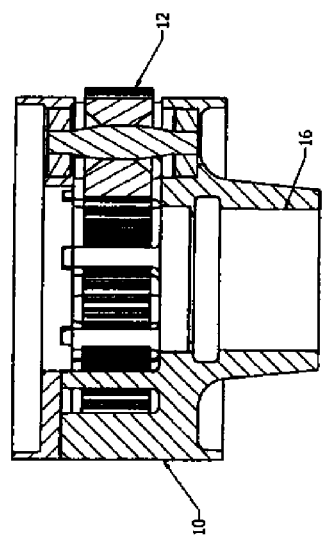
FIG. 3 is a partially cross-sectional view of a carrier with an asymmetric tapered flex pin in accordance with the present invention, with only one flex pin shown for clarity.

A middle part 34 of the shaft 14 has a generally cylindrical configuration. The planet gear 12 is press fitted onto the cylindrical middle part 34, as shown in FIGS. 3 and 6. The planet gear 12 has a reduced diameter contact surface that engages the middle part 34. Conical walls 13 and 17 extending from the contact surface of the planet gear 12 leave space for the flex pin 14 to deflect, as will be described in more detail hereinafter.

The conical portions 24 and 28 of the flex pin 14 each have outwardly convex exterior surfaces that have larger diameters closer to the centerline 26 and smaller diameters closer to the ends 20, 22. As a result, the shaft, or flex pin 14 have an asymmetric aspect, being wider in the middle part and narrower toward the ends. The longitudinal dimensions of the first conical portion 24 are at least somewhat greater than longitudinal dimensions of the second conical portion 28. As a result, the flex pin 14 has an additional asymmetric aspect, which is designed to facilitate flexing of the shaft 14 when torsional and rotational loads are applied to the gear assembly 10.

The first cylindrical end 20 is configured to be press or shrink-fitted with a spherical bearing 40; and the second end 22 is configured to be fitted with a spherical bearing 42. The spherical bearing 42 and the end 28 of the flex pin 14, when mounted in the carrier 11, are on the high-torque connection side of the gear assembly 10. The asymmetric double-tapered pin 14 allows the tilt from the load being off-center of the bearings 40 and 42 to balance the rotational "lead" of the high torque side of a straddle-type carrier 11.

FIG. 6 also illustrates the asymmetrical aspect of the flex pin 14. While the planet gear 12 engages the middle part 34 a gap 35 is created between the bearing 40 and the planet gear 12. Another gap 37 is formed between the bearing 42 and the planet gear 12. The gap 35 has a larger area in comparison to the gap 37.

Figure 7:
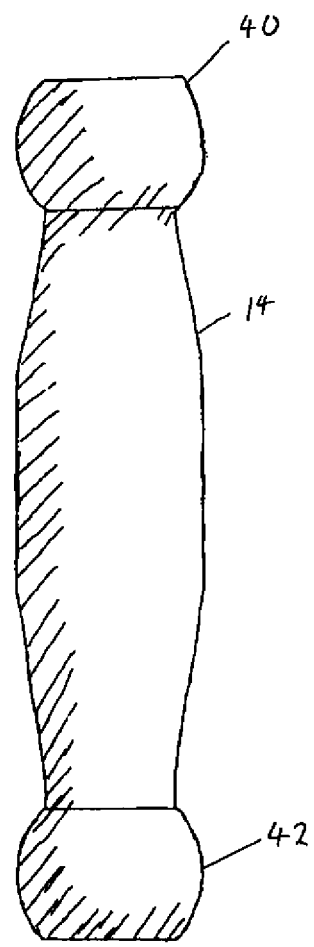
FIG. 7 is a perspective view of the asymmetric flexible pin of the system of the present invention in a load-free condition.
Figure 8:
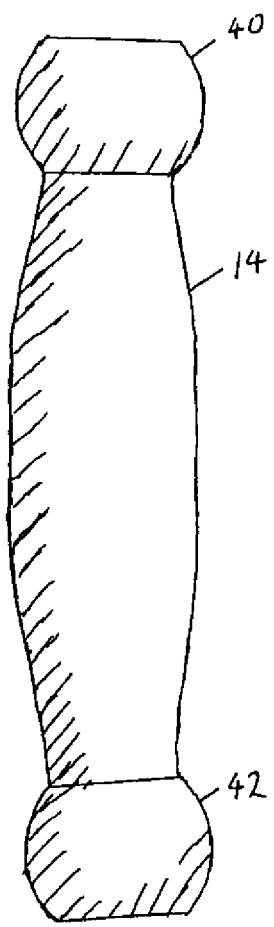
FIG. 8 is a perspective view of the asymmetric flexible pin in a partially flexed condition.
Figure 9:
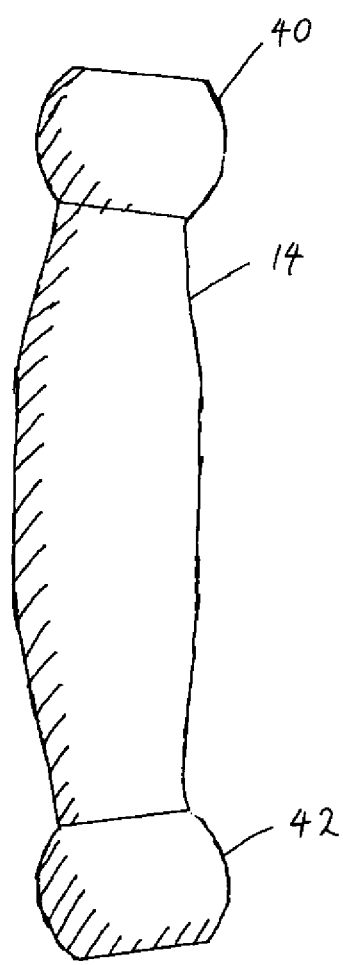
FIG. 9 is a perspective view of the asymmetric flexible pin in a fully flexed condition.
Figure 10:
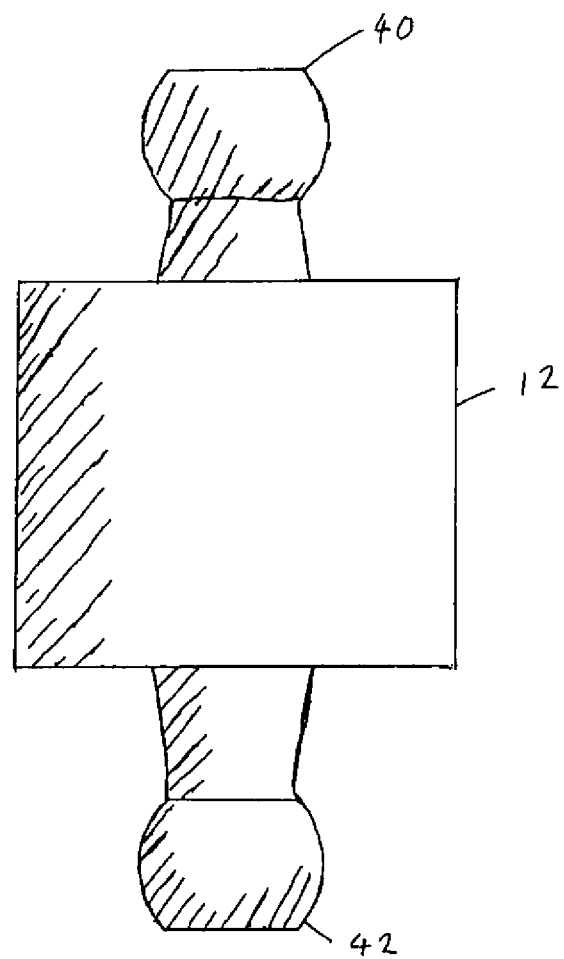
FIG. 10 is a perspective view of the planet gear with the asymmetric pin in a load-free condition.
Figure 11:
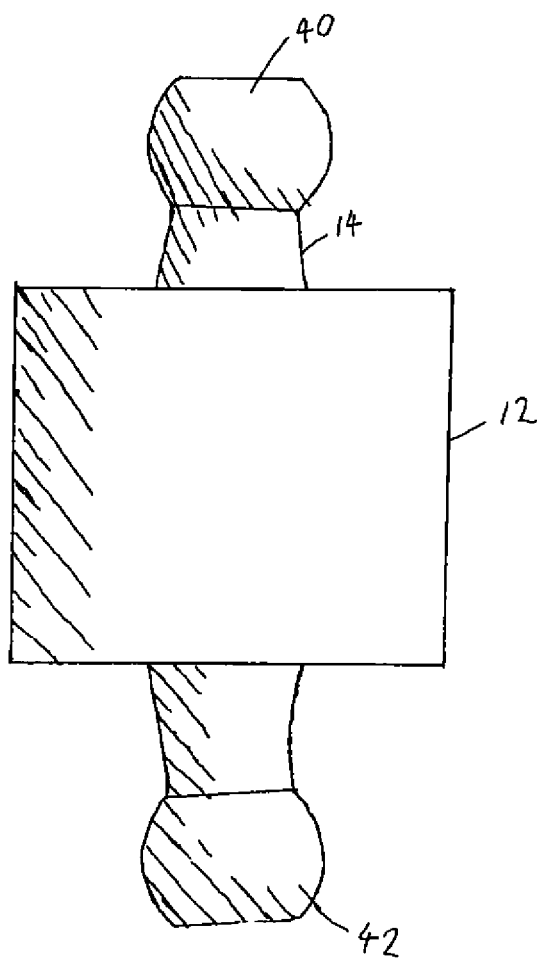
FIG. 11 is a perspective view of the planet gear with the asymmetric pin in a fully flexed condition.

Turning now to FIGS. 7-11, the flex pin 14 is shown in stages of deflection depending on the amount of load carried by the gears 12. FIGS. 7 and 10 illustrate the flex pin 14 in a load-free condition, where no flexing force is applied to the shaft 14. As the high torque end of the carrier 11 receives rotational force through the connection means 16 the pin 14 begins to deflect about its conical portions 24 and 28. FIG. 8 illustrates a gradual bending of the flex pin 14, and FIGS. 9 and 11 illustrate a significant deflection of the shaft 14. At the time of deflection, the middle part 34 and the ends 20, 22 of the flex pin 14 are supported by the planet gear 12 and the bearings, respectively.

Due to the asymmetric positioning of the carrier-engaging middle part the high torque end of the carrier 11 has a lead over the opposite end of the carrier. In the illustrated embodiment, the lead is about 0.455 mm. In this example, the gear teeth alignment from centerline bearing to centerline bearing is about 258 mm. FIGS. 7-11 illustrate the difference between the deflections that match the slope of deflections of the carrier in the "y" axis. The deflections of the pin 14 facilitate alignment of the planet gear with the sun and ring gear teeth.

The instant invention allows to carefully select the exact placement of the planet gear centerline with respect to the spherical bearings 40, 42, and the geometry of the pin 14. The large deflections of the flex pin 14 are desirable to equalize loads between the planet gears 12 and have proper alignment of the teeth of the gear at the same time.

The gear assembly of the present invention allows to substantially increase deflection at the same or lower stress for an identical load and to improve load sharing among planet gears.

The softness of the double tapered flex pin as a spring will allow small misalignments to correct themselves as force introduced by the misalignment on the gear tooth can be seen as a generally small additional moment added or subtracted to the moment and shear load applied to the flex pin. The flex pin of this invention tends to deflect in a way that minimizes the eccentric loading due to misalignment, and the softer (more deflection per given load) the flex pin, the less the misalignment will matter in the operation of the gear assembly of this invention.

Asymmetric placement of the shaft end supports facilitates a controlled deflection of the shaft such that the deflection of the planet shaft closely matches the deflection of the planet carrier, but in the exact opposite direction so that the planet gear alignment stays coaxial with the carrier rotation.

The structure of the instant gear assembly provides for asymmetric stiffness of the shaft 14 on opposite sides of the applied load, which is facilitated by different size of taper on two opposite sides of the point of load application. In the structure of the instant flex pin, the places of highest bending moment have the highest diameter while places of lower bending moment have smaller diameter, which tends to increase the deflection of the shaft while not raising the stress in the shaft.

The planet shafts may be made from carburized steel (or other hardened steel) to allow much smaller diameter to be used for higher spring deflection. The instant invention allows as much elastic deflection of the planet under load as possible to distribute loads between the planets. Additionally, the alignment of the planet gear with respect to the sun and ring gears is maintained due to the flexing abilities of the planet shafts.

Many changes and modifications can be made in the present invention without departing from the spirit thereof. I, therefore, pray that my rights to the present invention be limited only by the scope of the appended claims.

I claim:

1. A gear assembly comprising a plurality of planetary gear sets secured in a carrier, wherein each of said planetary gear sets comprises a gear member supported by a gear shaft disposed for rotation with a planetary gear set in relation to the carrier and having an asymmetric aspect along a gear shaft length, the gear shaft having its opposite ends supported within the carrier, the gear shaft being capable of defecting along at least a part of the gear shaft length when torsional and rotational loads are applied to the gear assembly, the gear shaft comprising a first end supported by a spherical bearing, a second end supported by a spherical bearing, a generally cylindrical middle part retained in contact with a contact surface of the gear member, a first tapered portion extending between the middle part and the first end, and a second tapered portion extending between the middle part and the second end.

2. A gear assembly comprising a plurality of gear sets secured in a carrier, wherein each of said gear sets comprises a gear member supported by a gear shaft disposed for rotation in relation to the carrier and having an asymmetric aspect along a gear shaft length, the gear shaft having its opposite ends supported within the carrier, the gear shaft being capable of defecting along at least a part of the gear shaft length when torsional and rotational loads are applied to the gear assembly, said gear shaft comprises a first end supported by a spherical bearing, a second end supported by a spherical bearing, a generally cylindrical middle part retained in contact with a contact surface of the gear member, a first tapered portion extending between the middle part and the first end, and a second tapered portion extending between the middle part and the second end, and wherein said first tapered portion and said second tapered portion are each integrally connected to the middle part at their respective widest diameter ends.

3. The apparatus of claim 1, wherein said first end and said second end each have a generally cylindrical outer surfaces capable of being engaged by a spherical bearing supporting the first end and the second end.

4. A gear assembly comprising a plurality of gear sets secured in a carrier, wherein each of said gear sets comprises a gear member supported by a gear shaft disposed for rotation in relation to the carrier and having an asymmetric aspect along a gear shaft length, the gear shaft having its opposite ends supported within the carrier, the gear shaft being capable of defecting along at least a part of the gear shaft length when torsional and rotational loads are applied to the gear assembly, said gear shaft comprises a first end supported by a spherical bearing, a second end supported by a spherical bearing, a generally cylindrical middle part retained in contact with a contact surface of the gear member, a first tapered portion extending between the middle part and the first end, and a second tapered portion extending between the middle part and the second end, and wherein the first end is adapted for connecting to a high torque side of the carrier.

5. The apparatus of claim 1, wherein the planet shaft is shrink-fitted to a contact surface of the gear member.

6. A gear assembly comprising a plurality of gear sets secured in a carrier, wherein each of said gear sets comprises a gear member supported by a gear shaft disposed for rotation in relation to the carrier and having an asymmetric aspect along a gear shaft length, the gear shaft having its opposite ends supported within the carrier, the gear shaft being capable of defecting along at least a part of the gear shaft length when torsional and rotational loads are applied to the gear assembly, said gear shaft comprises a first end supported by a spherical bearing, a second end supported by a spherical bearing, a generally cylindrical middle part retained in contact with a contact surface of the gear member, a first tapered portion extending between the middle part and the first end, and a second tapered portion extending between the middle part and the second end, and wherein the first end of the gear shaft and the second end of the gear shaft are each press-fitted to the respective spherical bearing.

7. The apparatus of claim 1, wherein the gear shaft has a double-taper aspect, tapering down from middle part toward the opposite ends.

8. An epicyclic gear assembly comprising a plurality of planetary gear sets secured in a carrier, wherein each of said planetary gear sets comprises a planet gear supported by a planet shaft, the planet shaft being disposed for rotation in relation to the carrier and having an asymmetric aspect along a length of the planet shaft, the planet shaft having its opposite ends supported within the carrier, the planet shaft being capable of defecting along at least a part of the shaft length when torsional and rotational loads are applied to the gear assembly, the planet shaft comprising a first end supported by a spherical bearing, a second end supported by a spherical bearing, a generally cylindrical middle part retained in contact with a contact surface of the planet gear, a first tapered portion extending between the middle part and the first end, and a second tapered portion extending between the middle part and the second end.

9. The apparatus of claim 8, wherein the planet shaft has a double-taper aspect, tapering down from middle part toward the first end and the second end.

10. The apparatus of claim 8, wherein the first end of the planet shaft and the second end of the planet shaft are each press-fitted to a respective spherical bearing supporting the first end and the second end.

11. A gear assembly comprising a plurality of gear sets secured in a carrier, wherein each of said gear sets comprises a gear member supported by a gear shaft, the gear shaft having its opposite ends supported within the carrier and disposed for rotation in relation to the carrier, the gear shaft having an asymmetric aspect along a gear shaft length and being capable of defecting along at least a part of the gear shaft length when torsional and rotational loads are applied to the gear assembly, the gear shaft comprising a first substantially cylindrical end, a second substantially cylindrical end, a middle part engaged with the gear member, a first tapered portion extending between the middle part and the first end, a second tapered portion extending between the middle part and the second end, a first concave portion defined between the first end and the first tapered portion and a second concave portion defined between the second end and the second tapered portion.

12. The assembly of claim 11, wherein the first tapered portion is unitary continuously connected to the first concave portion, and the second tapered portion is unitary continuously connected to the second concave portion.

13. The assembly of claim 12, wherein the first end is disposed for connecting to a high torque side of the carrier.

14. The assembly of claim 12, wherein the gear member is press fitted onto the middle part.

* * * * *